United States Patent
Aihara et al.

(10) Patent No.: US 11,174,376 B2
(45) Date of Patent: Nov. 16, 2021

(54) METHOD FOR PRODUCING POLYMER LATEX

(71) Applicant: ZEON CORPORATION, Tokyo (JP)

(72) Inventors: Shunjin Aihara, Tokyo (JP); Junji Kodemura, Tokyo (JP); Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 257 days.

(21) Appl. No.: 16/465,226

(22) PCT Filed: Nov. 2, 2017

(86) PCT No.: PCT/JP2017/039741
§ 371 (c)(1),
(2) Date: May 30, 2019

(87) PCT Pub. No.: WO2018/100969
PCT Pub. Date: Jun. 7, 2018

(65) Prior Publication Data
US 2020/0010651 A1    Jan. 9, 2020

(30) Foreign Application Priority Data

Nov. 30, 2016  (JP) ............................. JP2016-232388

(51) Int. Cl.
| | | |
|---|---|---|
| *C08L 9/10* | (2006.01) | |
| *B29C 41/00* | (2006.01) | |
| *B29C 41/14* | (2006.01) | |
| *C09J 5/00* | (2006.01) | |
| *C09J 11/08* | (2006.01) | |
| *C09J 109/10* | (2006.01) | |
| *B29K 105/00* | (2006.01) | |

(52) U.S. Cl.
CPC .............. *C08L 9/10* (2013.01); *B29C 41/003* (2013.01); *B29C 41/14* (2013.01); *C09J 5/00* (2013.01); *C09J 11/08* (2013.01); *C09J 109/10* (2013.01); *B29K 2105/0064* (2013.01); *C08L 2201/52* (2013.01); *C09J 2409/00* (2013.01); *C09J 2493/00* (2013.01)

(58) Field of Classification Search
CPC ....... C08L 9/10; C08L 2201/52; C09J 109/10; C09J 5/00; C09J 11/08; C09J 2105/0064; C09J 2409/00; C09J 2493/00; B29C 41/14; B29C 41/003
USPC ........................................................ 524/274
See application file for complete search history.

(56) References Cited

U.S. PATENT DOCUMENTS

2012/0006710 A1* 1/2012 Hatanaka .......... A61F 13/00076
                                                      206/441

FOREIGN PATENT DOCUMENTS

| GB | 1251924 A | 11/1971 | |
|---|---|---|---|
| JP | S49-5360 B1 | 2/1974 | |
| JP | 2001-270992 A | 10/2001 | |
| JP | 2006-143826 A | 6/2006 | |
| JP | 2006143826 A * | 6/2006 | |
| JP | 2015-193685 A | 11/2015 | |
| WO | 2010/110130 A1 | 9/2010 | |
| WO | 2014/181714 A1 | 11/2014 | |
| WO | WO-2014181714 A1 * | 11/2014 | ........... A61L 31/049 |

OTHER PUBLICATIONS

Translation of WO 2014/181714, Nov. 13, 2014. (Year: 2014).*
Translation of JP 2006-143826 (patents application 2004-333997), Jun. 8, 2006. (Year: 2006).*
Jul. 2, 2020 Extended European Search Report issued in European Patent Application No. 17876637.4.
Jun. 4, 2019 International Preliminary Report on Patentability issued in International Patent Application No. PCT/JP2017/039741.
Feb. 6, 2018 International Search Report issued in International Patent Application No. PCT/JP2017/039741.
Aug. 13, 2021 Office Action issued in Brazilian Patent Application No. 112019011002-0.

* cited by examiner

*Primary Examiner* — Hui H Chin
(74) *Attorney, Agent, or Firm* — Oliff PLC

(57) ABSTRACT

A method for producing a polymer latex, includes a step of emulsifying a polymer solution of a synthetic polyisoprene and/or a styrene-isoprene-styrene block copolymer, in water in the presence of a rosin and/or a rosin metal salt, thereby obtaining an emulsified liquid, wherein the rosin and/or the rosin metal salt to be used have/has a total content rate of abietic acid, neoabietic acid and palustric acid, and salts thereof, of 5% by weight or less.

13 Claims, No Drawings

METHOD FOR PRODUCING POLYMER LATEX

TECHNICAL FIELD

The present invention relates to a method for producing a polymer latex which can provide a dip molded article excellent in tensile strength and tear strength.

BACKGROUND ART

It has been conventionally known that a dip molded article for use in contact with the human body, such as a nipple, an air ball, a glove, a balloon and a sack, is obtained by dip molding of a latex composition containing a latex of natural rubber. A latex of natural rubber, however, contains a protein causing an allergy symptom in the human body, and thus is problematic in terms of use in a dip molded article that is in direct contact with the mucous membrane or organs of a living body. Therefore, studies about use of not a latex of natural rubber, but a latex of synthetic rubber have been increasingly made.

For example, Patent Document 1 discloses, as a latex for use in dip molding, a synthetic polyisoprene latex produced by use of a rosin metal salt as an emulsifier. On the other hand, such use of a rosin metal salt as an emulsifier has been demanded to enable the resulting synthetic polyisoprene latex to provide a dip molded article more improved in tensile strength and tear strength, although such a dip molded article can be excellent in tensile strength and tear strength in some degree.

RELATED ART

Patent Document

Patent Document 1: National Publication of International Patent Application No. 2015-193685

SUMMARY OF THE INVENTION

Problem to be Solved by the Invention

The present invention has been made in view of such circumstances, and an object thereof is to provide a method for producing a polymer latex which can provide a dip molded article excellent in tensile strength and tear strength.

Means for Solving the Problem

The present inventors have made intensive studies in order to achieve the above object, and as a result, have found that a polymer latex can be obtained as an emulsified liquid by emulsification in water, of a polymer solution of a synthetic polyisoprene and/or a styrene-isoprene-styrene block copolymer with a predetermined rosin and/or rosin metal salt as an emulsifier, to thereby allow a dip molded article obtained by use of such a polymer latex to be excellent in tensile strength and tear strength, thereby leading to completion of the present invention.

That is, according to the present invention, provided is a method for producing a polymer latex, including a step of emulsifying a polymer solution of a synthetic polyisoprene and/or a styrene-isoprene-styrene block copolymer, in water in the presence of a rosin and/or a rosin metal salt, thereby obtaining an emulsified liquid, wherein the rosin and/or the rosin metal salt to be used have/has a total content rate of abietic acid, neoabietic acid and palustric acid, and salts thereof, of 5% by weight or less.

It is preferable in the method for producing a polymer latex of the present invention that the synthetic polyisoprene and/or the styrene-isoprene-styrene block copolymer, to be used, be obtained according to polymerization by anionic polymerization.

It is preferable in the method for producing a polymer latex of the present invention that the polymer solution of the synthetic polyisoprene and/or the styrene-isoprene-styrene block copolymer be obtained according to polymerization by anionic polymerization, and the polymer solution be directly emulsified by use of an aqueous solution of the rosin and/or the rosin metal salt without any coagulation, to thereby obtain the emulsified liquid.

It is preferable in the method for producing a polymer latex of the present invention that a total content rate of the rosin and/or the rosin metal salt in the polymer latex be more than 1.5 parts by weight based on 100 parts by weight in total of the synthetic polyisoprene and/or the styrene-isoprene-styrene block copolymer included in the polymer latex.

It is preferable in the method for producing a polymer latex of the present invention that the rosin and/or the rosin metal salt to be used have/has a content rate of dehydroabietic acid, of 70 to 100% by weight.

According to the present invention, provided is a method for producing a latex composition, including a step of adding a vulcanizing agent to a polymer latex obtained by the production method.

In addition, according to the present invention, provided is a method for producing a dip molded article, including a step of dip molding a latex composition obtained by the production method.

Furthermore, according to the present invention, provided is a method for producing a packaging structure, including coating a first sheet substrate and/or a second sheet substrate with a polymer latex obtained by the production method, to form a coating film, and performing adhesion and stacking of at least a part of the first sheet substrate and at least a part of the second sheet substrate by the coating film, wherein an object to be packaged is receivable between the first sheet substrate and the second sheet substrate.

Effects of Invention

According to the present invention, there can provide a method for producing a polymer latex which can provide a dip molded article excellent in tensile strength and tear strength.

DESCRIPTION OF EMBODIMENTS

The method for producing a polymer latex of the present invention includes a step of emulsifying a polymer solution of a synthetic polyisoprene and/or a styrene-isoprene-styrene block copolymer, in water in the presence of a rosin and/or a rosin metal salt, thereby obtaining an emulsified liquid, wherein the rosin and/or the rosin metal salt to be used have/has a total content rate of abietic acid, neoabietic acid and palustric acid, and salts thereof, of 5% by weight or less. As the polymer solution of synthetic polyisoprene and/or styrene-isoprene-styrene block copolymer, a polymer solution of synthetic polyisoprene, a polymer solution of a styrene-isoprene-styrene block copolymer, or a polymer solution containing a synthetic polyisoprene and a styrene-isoprene-styrene block copolymer can be used.

Polymer Solution of Synthetic Polyisoprene

In the polymer solution of synthetic polyisoprene, the synthetic polyisoprene included may be a homopolymer of isoprene or may be copolymerized with other ethylenically unsaturated monomer copolymerizable with isoprene. The content of the isoprene unit in the synthetic polyisoprene is preferably 70% by weight or more, more preferably 90% by weight or more, further preferably 95% by weight or more, particularly preferably 100% by weight (homopolymer of isoprene) based on the total monomer unit, because a film molded article such as a flexible dip molded article excellent in tensile strength is easily obtained.

Examples of such other ethylenically unsaturated monomer copolymerizable with isoprene include conjugated diene monomers other than isoprene, such as butadiene, chloroprene and 1,3-pentadiene; ethylenically unsaturated nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (meth)acrylate (which means "methyl acrylate and/or methyl methacrylate", hereinafter, much the same is true on ethyl (meth)acrylate and the like.), ethyl (meth)acrylate, butyl (meth)acrylate and 2-ethylhexyl (meth)acrylate. Such other ethylenically unsaturated monomers copolymerizable with isoprene may be used singly or in combinations of two or more kinds thereof.

The synthetic polyisoprene may be obtained according to a conventionally known method, for example, any polymerization such as coordination polymerization or anionic polymerization, and for example, polymerization by coordination polymerization is suitably a method including subjecting isoprene and, if necessary, other ethylenically unsaturated monomer copolymerizable therewith to solution polymerization in an inert polymerization solvent by use of a Ziegler type polymerization catalyst, thereby obtaining a polymer solution of the synthetic polyisoprene. The Ziegler type polymerization catalyst is not particularly limited, a known catalyst can be used, and examples thereof include a catalytic system where a titanium trichloride composition obtained by reducing titanium tetrachloride with an organoaluminum compound and further treating the resultant with any of various electron donors and electron acceptors is combined with an organoaluminum compound, and a supported catalytic system obtained by bringing magnesium halide into contact with titanium tetrachloride and any of various electron donors. Among them, a catalytic system with titanium tetrachloride and an organoaluminum compound is preferable, and a catalytic system with titanium tetrachloride and trialkyl aluminum is particularly preferable.

Alternatively, polymerization by anionic polymerization is suitably a method including subjecting isoprene and, if necessary, other ethylenically unsaturated monomer copolymerizable therewith to solution polymerization in an inert polymerization solvent by use of an organic alkali metal catalyst, thereby obtaining a polymer solution of synthetic polyisoprene. The polymerization catalyst in anionic polymerization is preferably an organic alkali metal catalyst because use of such an organic alkali metal catalyst can allow highly living anionic polymerization to progress, thereby obtaining synthetic polyisoprene high in weight average molecular weight. The organic alkali metal catalyst is not particularly limited, a known organic alkali metal catalyst can be used, and examples include organomonolithium compounds such as n-butyllithium, sec-butyllithium, t-butyllithium, hexyllithium, phenyllithium and stilbene lithium; organic polyvalent lithium compounds such as dilithiomethane, 1,4-dilithiobutane, 1,4-dilithio-2-ethylcyclohexane, 1,3,5-trilithiobenzene and 1,3,5-tris(lithiomethyl)benzene; organosodium compounds such as sodium naphthalene; and organopotassium compounds such as potassium naphthalene. Among them, any organomonolithium compound is preferably used, and n-butyllithium is more preferably used. Such organic alkali metal catalysts can be each used singly or in combinations of two or more kinds thereof.

Examples of the polymerization solvent for use in polymerization can include an organic solvent, and examples can include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as butane, pentane, hexane and heptane; and halogenated hydrocarbon solvents such as methylene chloride, chloroform and ethylene dichloride. Among them, aliphatic hydrocarbon solvents are preferable, butane, hexane and pentane are more preferable, hexane is further preferable, and n-hexane is particularly preferable.

The isoprene unit in the synthetic polyisoprene is present in the form of four types including a cis bond unit, a trans bond unit, a 1,2-vinyl bond unit and a 3,4-vinyl bond unit depending on the binding state of isoprene. The content rate of the cis bond unit in the isoprene unit included in the synthetic polyisoprene is preferably 70% by weight or more, more preferably 90% by weight or more, further preferably 95% by weight or more based on the total isoprene unit from the viewpoint of an enhancement in tensile strength of the resulting dip molded article.

The weight average molecular weight of the synthetic polyisoprene is preferably 10,000 to 5,000,000, more preferably 500,000 to 5,000,000, further preferably 800,000 to 3,000,000 in terms of standard polystyrene by gel permeation chromatography analysis. The weight average molecular weight of the synthetic polyisoprene is in the range, resulting in a tendency to not only enhance tensile strength of the resulting film molded article in the case of formation into a dip molded article, but also easily produce a polymer latex.

The polymer Mooney viscosity ($ML_{1+4}$, 100° C.) of the synthetic polyisoprene is preferably 50 to 80, more preferably 60 to 80, further preferably 70 to 80.

Polymer Solution of Styrene-Isoprene-Styrene Block Copolymer

The styrene-isoprene-styrene block copolymer (SIS) included in the polymer solution of the styrene-isoprene-styrene block copolymer is a block copolymer of styrene and isoprene ("S" represents a styrene block and "I" represents an isoprene block, respectively.). The content rate in the styrene unit and the isoprene unit in the SIS, as a weight ratio of "styrene unit:isoprene unit", is usually in the range of 1:99 to 90:10, preferably 3:97 to 70:30, more preferably 5:95 to 50:50, further preferably 10:90 to 30:70.

The SIS may be obtained according to a conventionally known method, for example, any polymerization such as coordination polymerization or anionic polymerization, and for example, polymerization by coordination polymerization is suitably a method including subjecting a styrene-containing monomer and an isoprene-containing monomer to solution polymerization in an inert polymerization solvent by use of a Ziegler type polymerization catalyst, thereby obtaining a polymer solution of the SIS. The Ziegler type polymerization catalyst is not particularly limited, and the above-mentioned Ziegler type polymerization catalyst can be used.

Alternatively, polymerization by anionic polymerization is suitably a method including subjecting a styrene-containing monomer and an isoprene-containing monomer to solution polymerization in an inert polymerization solvent by use of an organic alkali metal catalyst, thereby obtaining a polymer solution of the SIS. The polymerization catalyst in anionic polymerization is preferably an organic alkali metal catalyst because use of such an organic alkali metal catalyst can allow highly living anionic polymerization to progress, thereby obtaining synthetic polyisoprene high in weight average molecular weight. The organic alkali metal catalyst is not particularly limited, and the above-mentioned organic alkali metal catalyst can be used.

The inert polymerization solvent may be any solvent as long as such any solvent is inert to a polymerization reaction, and, for example, the above-mentioned organic solvent can be used.

The polymerization temperature in solution polymerization of a styrene-containing monomer and an isoprene-containing monomer is preferably 35 to 80° C., more preferably 40 to 75° C. from the viewpoint that a polymer latex can be produced at high productivity.

The weight average molecular weight of the SIS is preferably 50,000 to 500,000, more preferably 70,000 to 400,000, further preferably 100,000 to 350,000 in terms of standard polystyrene by gel permeation chromatography analysis. The weight average molecular weight of the SIS is in the range, resulting in a tendency to not only enhance tensile strength of a dip molded article, but also easily produce a polymer latex.

The molecular weight distribution (Mw/Mn) of the SIS is preferably 1.0 to 2.6, more preferably 1.0 to 2.4, further preferably 1.0 to 2.2. The molecular weight distribution (Mw/Mn) can be in the range, resulting in a more enhancement in tensile strength of the resulting dip molded article while suppressing an increase in the viscosity of a polymer solution obtained by dissolution of the SIS in an organic solvent.

While any one of or both the synthetic polyisoprene and the SIS may be used in the method for producing a polymer latex of the present invention, the synthetic polyisoprene is preferably used to produce a latex of synthetic polyisoprene.

Polymer Latex

The method for producing a polymer latex of the present invention enables a polymer latex to be produced by use of the polymer solution of synthetic polyisoprene and/or SIS, obtained by coordination polymerization or anionic polymerization, according to the following method. That is, examples include (1) a method including obtaining synthetic polyisoprene and/or SIS once coagulated, from polymer solution of synthetic polyisoprene and/or SIS, obtained by coordination polymerization or anionic polymerization, dissolving or finely dispersing the resultant in an organic solvent, thereby obtaining polymer solution (solution or fine suspension) of synthetic polyisoprene and/or SIS, and emulsifying the resulting polymer solution of synthetic polyisoprene and/or SIS in water in the presence of a rosin and/or a rosin metal salt as an emulsifier, thereby producing a polymer latex, and (2) a method including directly emulsifying a polymer solution of a synthetic polyisoprene obtained by coordination polymerization or anionic polymerization, in water in the presence of a rosin and/or a rosin metal salt as an emulsifier without any coagulation, thereby producing a polymer latex. While any of the methods (1) and (2) may be adopted, the method (2) is preferably adopted because heat history by coagulation or the like can be reduced to thereby allow the resulting dip molded article to be excellent in tensile strength and elongation in use of synthetic polyisoprene and/or SIS obtained by anionic polymerization.

Examples of the organic solvent for use in the production method (1) can include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as pentane, hexane and heptane; and halogenated hydrocarbon solvents such as methylene chloride, chloroform and ethylene dichloride. Among them, aliphatic hydrocarbon solvents are preferable, hexane is more preferable, and n-hexane is particularly preferable.

The amount of the organic solvent to be used is here preferably 2,000 parts by weight or less, more preferably 20 to 1,500 parts by weight, further preferably 500 to 1,500 parts by weight based on 100 parts by weight in total of the synthetic polyisoprene and the SIS.

In both the methods (1) and (2) in the present invention, a rosin and/or a rosin metal salt (hereinafter, sometimes referred to as "rosin-based surfactant".) are/is used as an emulsifier for emulsification of synthetic polyisoprene and/or SIS, and in particular, such a rosin-based surfactant to be used is one where the total content rate of abietic acid, neoabietic acid and palustric acid, and salts thereof is 5% by weight or less. According to the present invention, the specified rosin-based surfactant can be used as an emulsifier, thereby allowing a dip molded article obtained by the resulting polymer latex to be enhanced in tensile strength and tear strength.

That is, first, when the polymer solution is emulsified in water in the presence of an emulsifier to obtain a polymer latex, the emulsifier slightly remains in the resulting polymer latex. The present inventors have found that use of a rosin-based surfactant as an emulsifier causes the rosin-based surfactant to slightly remain in the resulting polymer latex, and a latex composition obtained by use of such a polymer latex with addition of a vulcanizing agent such as sulfur is tried to be molded into a dip molded article, to thereby cause any resin acid (in particular, abietic acid, neoabietic acid and palustric acid having a conjugated double bond) derived from the rosin-based surfactant included in the polymer latex to react with the vulcanizing agent such as sulfur, resulting in a reduction in crosslinking efficiency of the dip molded article and reductions in tensile strength and tear strength of the dip molded article.

On the contrary, according to the present invention, use of a rosin-based surfactant where the total content rate of abietic acid, neoabietic acid and palustric acid, and salts thereof is 5% by weight or less, as an emulsifier, can allow the resulting dip molded article to be suppressed in reductions in tensile strength and tear strength due to the action of such a rosin-based surfactant, thereby allowing a dip molded article excellent in tensile strength and tear strength to be provided.

The rosin for use in the present invention can be any rosin made of, as a raw material, any natural resin containing a resin acid such as abietic acid, neoabietic acid, palustric acid, pimaric acid, isopimaric acid, and dehydroabietic acid, examples include tall rosin obtained from crude tall oil as a by-product in a production step of pulp; gum rosin obtained from Namamatsu tar; and wood rosin extracted from pine cut, and among them, tall rosin is preferable. The rosin metal salt which may be used is a metal salt of any resin acid included in such rosin, and, for example, a potassium salt of rosin (mixture of respective potassium salts of resin acids included in rosin) and a sodium salt of rosin (mixture of respective sodium salts of resin acids included in rosin) are preferable, a potassium salt of tall rosin and a sodium salt of tall rosin are more preferable.

The total content rate of abietic acid, neoabietic acid and palustric acid, and salts thereof in the rosin and/or the rosin metal salt (rosin-based surfactant) for use in the present invention may have 5% by weight or less, as described above, and is preferably 3% by weight or less, more preferably 1% by weight or less. A too high total content rate of abietic acid, neoabietic acid and palustric acid, and salts thereof causes the suppression effect of reductions in tensile strength and tear strength of the resulting dip molded article to be insufficient. The lower limit of the total content rate of abietic acid, neoabietic acid and palustric acid, and salts thereof is not particularly limited.

The rosin-based surfactant for use in the present invention may have a total content rate of abietic acid, neoabietic acid and palustric acid, and salts thereof, of 5% by weight or less, as described above, and in particular, the content rate of abietic acid and a salt thereof is 5% by weight or less, preferably 3% by weight or less, more preferably 1% by weight or less. The content rate of abietic acid and a salt thereof can be in the range, thereby allowing tensile strength and tear strength of the resulting dip molded article to be more enhanced. That is, abietic acid and a salt thereof, among resin acids included in the rosin-based surfactant, are relatively high in reactivity with a vulcanizing agent such as sulfur and are high in the action of a reduction in crosslinking efficiency of the resulting dip molded article, and thus the content rate of such abietic acid and salt thereof can be controlled in the range, thereby allowing tensile strength and tear strength of the resulting dip molded article to be more enhanced.

The method for controlling the total content rate of abietic acid, neoabietic acid and palustric acid, and salts thereof in the rosin-based surfactant within the range is not particularly limited, and is preferably a method including disproportionation of the rosin-based surfactant by use of a disproportionation catalyst.

The disproportionation catalyst is not particularly limited, a known catalyst, for example, a supported catalyst such as palladium-carbon, rhodium-carbon or platinum-carbon; a metal powder such as nickel or platinum; or an iodine-based catalyst such as iodine, iron iodide, nickel iodide, tin iodide, zinc iodide, cobalt iodide or copper iodide can be used, and, among them, a supported catalyst is preferable and palladium-carbon is more preferable.

The reaction conditions in disproportionation of the rosin-based surfactant are not particularly limited, and such a reaction is preferably performed in the presence of the disproportionation catalyst in an atmosphere of an inert gas such as a nitrogen gas. The reaction temperature here is not particularly limited, and is preferably 100 to 300° C., more preferably 200 to 250° C. The reaction time is not particularly limited, and is preferably 1 to 10 hours, more preferably 2 to 5 hours.

When the rosin-based surfactant is disproportionated, abietic acid, neoabietic acid and palustric acid among resin acids included in the rosin-based surfactant are at least partially converted into dehydroabietic acid or the like by a disproportionation reaction.

The content rate of dehydroabietic acid in the rosin-based surfactant disproportionated is not particularly limited, and is preferably 70 to 100% by weight, more preferably 80% by weight or more, further preferably 90% by weight or more, and more preferably 96% by weight or less, further preferably 93% by weight or less. The content rate of dehydroabietic acid can be in the range (namely, the content rate of dehydroabietic acid is controlled to the range by generation of dehydroabietic acid in the rosin-based surfactant due to disproportionation of the rosin-based surfactant), resulting in a reduction in the content rate of abietic acid, neoabietic acid and palustric acid, and salts thereof in the rosin-based surfactant, to thereby allow tensile strength and tear strength of the resulting dip molded article to be more enhanced.

The amount of the rosin-based surfactant to be used as an emulsifier in emulsification of the synthetic polyisoprene and/or the SIS is preferably 1 to 15 parts by weight, more preferably 3 to 12 parts by weight, further preferably 5 to 10 parts by weight based on 100 parts by weight in total of the synthetic polyisoprene and the SIS. The amount of the rosin-based surfactant to be used can be in the range, thereby not only allowing emulsification to be more favorably performed, but also allowing tensile strength and tear strength of the resulting dip molded article to be more enhanced.

The amount of water for use in emulsification of the synthetic polyisoprene and/or the SIS is preferably 10 to 200 parts by weight, more preferably 30 to 100 parts by weight, most preferably 50 to 70 parts by weight based on 100 parts by weight of the polymer solution of the synthetic polyisoprene and/or the SIS. Examples of the type of water to be used include hard water, soft water, ion-exchange water, distilled water and zeolite water, and soft water, ion-exchange water and distilled water are preferable. A too small amount of water to be used causes emulsification to be insufficient, and, on the other hand, a too large amount thereof causes productivity to be deteriorated.

In emulsification in water, of the polymer solution of the synthetic polyisoprene and/or the SIS, in the presence of the rosin-based surfactant as an emulsifier, an emulsifying apparatus generally commercially available as an emulsifying machine or a dispersing machine can be used without any particular limitation. The method for adding the rosin-based surfactant to the polymer solution of the synthetic polyisoprene and/or the SIS is not particularly limited, and the surfactant may be added to any one of or both water and the polymer solution of the synthetic polyisoprene and/or the SIS in advance, may be added to an emulsified liquid during an emulsifying operation, or may be added collectively or in portions.

As the emulsifying apparatus, a batch type emulsifying machine such as trade name "Homogenizer" (manufactured by IKA), trade name "Polytron" (manufactured by Kinematica) or trade name "TK Auto Homomixer" (manufactured by Primix Corporation); a continuous emulsifying machine such as trade name "TK-pipeline homomixer" (manufactured by Primix Corporation), trade name "Colloid Mill" (manufactured by Shinko Pantech Co., Ltd.), trade name "Slusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.) or trade name "Fine flow mill" (manufactured by Pacific Machinery & Engineering Co., Ltd.); a high-pressure emulsifying machine such as trade name "Microfluidizer" (manufactured by Mizuho Industrial Co., Ltd.), trade name "Nanomizer" (manufactured by Nanomizer Inc.) or trade name "APV Gaulin" (manufactured by APV Gaulin Inc.); a membrane emulsifying machine such as trade name "Membrane emulsifying machine" (manufactured by Reica Co., Ltd.); a vibration type emulsifying machine such as trade name "Vibromixer" (manufactured by Reica Co., Ltd.); or an ultrasonic emulsifying machine such as a trade name "Ultrasonic homogenizer" (manufactured by Branson Ultrasonics, Emerson Japan, Ltd.) can be used. Herein, the emulsifying operation conditions by the emulsifying apparatus are not particularly limited, and the treatment temperature and the treatment time may be appropriately selected so that a desired dispersing state is achieved.

It is desirable to remove the organic solvent from an emulsified liquid obtained by emulsification in water of the polymer solution of the synthetic polyisoprene and/or the SIS in the presence of the rosin-based surfactant as an emulsifier. The method for removing the organic solvent from the emulsified liquid is preferably a method which enables the content of the organic solvent (preferably aliphatic hydrocarbon solvent) in the emulsified liquid to be 500 ppm by weight or less, for example, a method of distillation under reduced pressure, atmospheric distillation, steam distillation or centrifugation can be adopted, and among them, distillation under reduced pressure is preferable from the viewpoint that the organic solvent can be properly and effectively removed.

To the emulsified liquid from which the organic solvent is removed may be compounded additive(s) commonly compounded in the latex field, such as a pH adjuster, a defoamer, a preservative, a chelating agent, an oxygen scavenger, a dispersing agent and an antioxidant. Examples of the pH adjuster include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and any alkali metal hydroxide or ammonia is preferable.

After removal of the organic solvent, if necessary, any concentrating operation is desirably performed by a method of distillation under reduced pressure, atmospheric distillation, centrifugation, membrane concentration or the like in order to increase the solid content concentration of the polymer latex, and in particular, centrifugation is preferably performed from the viewpoint that not only the solid content concentration in the polymer latex can be increased, but also the content of the rosin-based surfactant in the polymer latex can be adjusted.

Centrifugation can be performed using, for example, a continuous centrifuge machine or a batch type centrifuge machine, and is preferably performed using a continuous centrifuge machine from the viewpoint that productivity of the polymer latex is excellent. In the case of concentration of the emulsified liquid by centrifugation, the polymer latex can be obtained as a light liquid which is a part of a dispersion liquid after centrifugation. Thus, such centrifugation can allow a residue liquid after removal of the polymer latex as a light liquid to include a desired amount of the rosin-based surfactant which is to be removed, resulting in proper adjustment of the content of the rosin-based surfactant in the finally resulting polymer latex.

The content rate of the rosin-based surfactant in the finally resulting polymer latex is preferably more than 1.5 parts by weight, more preferably more than 1.7 parts by weight, further preferably 1.8 parts by weight or more, preferably 10 parts by weight or less, more preferably 5 parts by weight or less, further preferably 3 parts by weight or less based on 100 parts by weight in total of the synthetic polyisoprene and/or the SIS included in the latex.

The solid content concentration of the emulsified liquid (emulsified liquid before centrifugation) for use in centrifugation is preferably 5 to 11% by weight, more preferably 7 to 10.7% by weight, further preferably 9 to 10.5% by weight. The solid content concentration of the emulsified liquid before centrifugation is preferably in the range, because aggregation of the synthetic polyisoprene, the SIS, and the like in centrifugation can be prevented, to result in not only an enhancement in mechanical stability of the emulsified liquid, but also proper adjustment of the amount of the rosin-based surfactant in the finally resulting polymer latex to a desired amount. The emulsified liquid after removal of the organic solvent may be used as it is or the emulsified liquid after adjustment of the solid content concentration may be used, in centrifugation.

The conditions in centrifugation are as follows: in use of a continuous centrifuge machine, the centrifugal acceleration is preferably 5,000 to 11,000 G, more preferably 6,000 to 10,000 G, further preferably 7,000 to 9,500 G, the amount of the emulsified liquid to be fed to the continuous centrifuge machine is preferably 0.5 to 1.5 m$^3$/hour, more preferably 0.7 to 1.45 m$^3$/hour, further preferably 0.9 to 1.4 m$^3$/hour, the retention time in the continuous centrifuge machine is preferably 2.0 to 4.0 minutes, more preferably 2.5 to 3.0 minutes, and the back pressure (gauge pressure) of the centrifuge machine is preferably 0.03 to 1.6 MPa. The centrifugation conditions are preferably as described above, because aggregation of the synthetic polyisoprene, the SIS, and the like in centrifugation can be prevented, to result in not only an enhancement in mechanical stability of the emulsified liquid, but also proper adjustment of the amount of the rosin-based surfactant in the finally resulting polymer latex to a desired amount.

The amount of the rosin-based surfactant in the polymer latex can be adjusted by appropriately combining mainly the amount of the rosin-based surfactant for use in emulsification in water, of the polymer solution of the synthetic polyisoprene and/or the SIS, the solid content concentration of the emulsified liquid before centrifugation, conditions in centrifugation, and the like. For example, it is considered that, when the amount of the rosin-based surfactant for use in emulsification in water, of the polymer solution of the synthetic polyisoprene and/or the SIS, is relatively small, the amount of the rosin-based surfactant to be removed by centrifugation may be relatively small to enable the centrifugal acceleration in the continuous centrifuge machine to be increased over the range and/or enable the amount of the emulsified liquid fed to the continuous centrifuge machine to be increased.

Latex Composition

The method for producing a latex composition of the present invention includes a step of adding a vulcanizing agent to the polymer latex of the present invention.

Examples of the vulcanizing agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, N,N'-dithio-bis(hexahydro-2H-azepinone-2), phosphorus-containing polysulfide, polymeric polysulfide and 2-(4'-morpholinodithio)benzothiazole. Among them, sulfur can be preferably used. Such vulcanizing agents can be used singly or in combinations of two or more kinds thereof.

The content of the vulcanizing agent is not particularly limited, and is preferably 0.1 to 10 parts by weight, more preferably 0.2 to 3 parts by weight based on 100 parts by weight in total of the synthetic polyisoprene and the SIS included in the latex. The content of the vulcanizing agent can be in the range, thereby allowing tensile strength of the resulting dip molded article to be more enhanced.

The latex composition preferably further contains a vulcanizing accelerator.

A vulcanizing accelerator usually used in a method for providing dip molding can be used, and examples include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthiocarbarylthio)benzothiazole, 2-(2,6-dimethyl-4-morpholinothio)benzothiazole, 2-(4'-morpholino-dithio)benzothiazole, 4-morpholinyl-2-benzothiazyl-disulfide and 1,3-bis(2-benzothiazyl-mercaptomethyl)urea, and zinc diethyldithiocarbamate, zinc 2-dibutyldithiocarbamate and zinc 2-mercaptobenzothiazole are preferable. The vulcanizing accelerator can be used singly or in combinations of two or more kinds thereof.

The content of the vulcanizing accelerator is preferably 0.05 to 5 parts by weight, more preferably 0.1 to 2 parts by weight based on 100 parts by weight in total of the synthetic polyisoprene and the SIS contained in the latex. The content of the vulcanizing accelerator can be in the range, thereby allowing tensile strength of the resulting dip molded article to be more enhanced.

The latex composition preferably further contains an antioxidant. Examples of the antioxidant include phenol-based antioxidants containing no sulfur atom, such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, and a butylated reaction product of p-cresol and dicyclopentadiene; thiobisphenol-based antioxidants such as 2,2'-thiobis-(4-methyl-6-t-butylphenol), 4,4'-thiobis-(6-t-butyl-o-cresol) and 2,6-di-t-butyl-4-(4,6-bis(octylthio)-1,3,5-triazine-2-ylamino)phenol; phosphorous acid ester-based antioxidants such as tris(nonylphenyl)phosphite, diphenylisodecyl phosphite and tetraphenyldipropylene glycol-diphosphite; sulfur ester-based antioxidants such as dilauryl thiodipropionate; amine-based antioxidants such as phenyl-α-naphthylamine, phenyl-β-naphthylamine, p-(p-toluenesulfonylamide)-diphenylamine, 4,4'-(α,α-dimethylbenzyl) diphenylamine, N,N-diphenyl-p-phenylenediamine, N-isopropyl-N'-phenyl-p-phenylenediamine and a butylaldehyde-aniline condensate; quinoline-based antioxidants such as 6-ethoxy-2,2,4-trimethyl-1,2-dihydroquinoline; and hydroquinone-based antioxidants such as 2,5-di-(t-amyl)hydroquinone. Such antioxidants can be used singly or in combinations of two or more kinds thereof. Among them, any phenol-based antioxidant is preferable and any phenol-based antioxidant containing no sulfur atom is more preferable because such antioxidants are less in the action of inhibiting a vulcanization reaction and are high in the oxidation prevention effect.

The content of the antioxidant is preferably 0.1 to 10 parts by weight, more preferably 1 to 7 parts by weight, further preferably 3 to 6 parts by weight based on 100 parts by weight in total of the synthetic polyisoprene and the SIS contained in the latex. The content of the antioxidant is preferably in the range because a sufficient oxidation prevention effect can be obtained without any inhibition of a vulcanization reaction in vulcanization.

The latex composition preferably further contains zinc oxide.

The content of the zinc oxide is not particularly limited, and is preferably 0.1 to 5 parts by weight, more preferably 0.2 to 2 parts by weight based on 100 parts by weight in total of the synthetic polyisoprene and the SIS contained in the latex. The content of the zinc oxide can be in the range, thereby allowing tensile strength of the resulting dip molded article to be more enhanced, with emulsification stability being favorable.

To the latex composition can be, if necessary, further compounded a compounding agent, for example, an dispersing agent; a reinforcement agent such as carbon black, silica or talc; a filler such as calcium carbonate or clay; an ultraviolet absorber; or a plasticizer.

Examples of the method for preparing the latex composition of the present invention include, but are not particularly limited, a method including mixing the vulcanizing agent and/or the vulcanizing accelerator, and various compounding agents, if necessary, compounded, such as an antioxidant, with the polymer latex by use of a dispersing machine such as a ball mill, a kneader or a disper, and a method including preparing an aqueous dispersion liquid of compounding components other than the polymer latex, by use of the dispersing machine, and thereafter mixing the aqueous dispersion liquid with the polymer latex.

The pH of latex composition is preferably 7 or more, more preferably in the range of 7 to 13, further preferably in the range of 8 to 12. The solid content concentration of the latex composition is preferably in the range of 15 to 65% by weight.

The latex composition is preferably subjected to aging (pre-crosslinking) before dip molding from the viewpoint that mechanical properties of the resulting dip molded article are more enhanced. The pre-crosslinking time is not particularly limited, and is preferably 1 to 14 days, more preferably 1 to 7 days, depending on the pre-crosslinking temperature. The pre-crosslinking temperature is preferably 20 to 40° C.

The resultant is preferably stored at a temperature of 10 to 30° C. for the period from completion of the pre-crosslinking to dip molding. Storage of the resultant at a high temperature may cause a reduction in tensile strength of the resulting dip molded article.

Dip Molded Article

The method for producing a dip molded article of the present invention includes a step of dip molding the latex composition. Dip molding means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip molded article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit formed on the mold is usually dried by heating. The drying conditions may be appropriately selected.

Next, the deposit formed on the mold is crosslinked by heating.

While the heating conditions in crosslinking are not particularly limited, the heating temperature is preferably 60 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

The mold is preferably washed with water or warm water in order to remove water-soluble impurities (for example, excessive surfactant and/or coagulating agent) before or after heating the mold on which the latex composition is deposited. The warm water used is preferably at 40° C. to 80° C., more preferably at 50° C. to 70° C.

The dip molded article after crosslinking is detached from the mold. Specific examples of the detaching method include a method for releasing the article from the mold by hand and a method for releasing the article by water pressure or compressed air pressure. When the dip molded article during crosslinking has a sufficient strength for detaching, the dip molded article may be detached during crosslinking and continuously subsequently crosslinked.

The dip molded article is obtained using the latex composition obtained by the production method of the present invention, and is thus excellent in tensile strength and can be particularly suitably used as a glove. When the dip molded article is a glove, an inorganic fine particle of talc, calcium carbonate or the like, or an organic fine particle such as a starch particle may be spread on the glove surface, an elastomer layer containing a fine particle may be formed on the glove surface, or the surface layer of the glove may be chlorinated, in order to prevent adhesion on the contact surface of the dip molded article to thereby enhance slipping during detachment.

The dip molded article can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

Packaging Structure

The method for producing a packaging structure of the present invention includes a step of coating a first sheet substrate and/or a second sheet substrate with the polymer latex, to form a coating film, and performing adhesion and stacking of at least a part of the first sheet substrate and at least a part of the second sheet substrate by the coating film. A packaging structure obtained by the production method of the present invention exhibits a structure that is obtained by performing adhesion and stacking of a first sheet substrate and a second sheet substrate each coated with the polymer latex, and that can receive an object to be packaged. Specifically, the packaging structure is a structure obtained by pushing the first sheet substrate and the second sheet substrate with a surface of the first sheet substrate and a surface of the second sheet substrate, coated with the polymer latex (surfaces coated with the latex), being in contact with each other so that the surfaces coated with the latex are opposite to each other with an object to be packaged being, if necessary, interposed therebetween, to thereby allow the first sheet substrate and the second sheet substrate to adhere to each other, thereby enabling the object to be packaged, to be packaged. Examples of the object to be packaged include, but are not particularly limited, various objects to be packaged, which are desired to be sterilized, such as a plaster. Examples of the first sheet substrate and the second sheet substrate include, but are not particularly limited, a paper material such as glassine paper, a high-density polyethylene unwoven cloth, a polyolefin film, and a polyester film, and among them, a paper material is preferable and glassine paper is particularly preferable because such paper materials are excellent in handleability (have proper bendability) and are inexpensive.

EXAMPLES

Hereinafter, the present invention will be more specifically described with reference to Examples and Comparative Examples, but the present invention is not intended to be limited to such Examples. Hereinafter, unless particularly noted, "part(s)" is on a weight basis. The test or evaluation methods of physical properties and characteristics are as follows.

Weight Average Molecular Weight (Mw)

Dilution with tetrahydrofuran was made so that the solid content concentration of the synthetic polyisoprene included in the polymer solution was 0.1% by weight, and the solution was subjected to gel permeation chromatography analysis to calculate the weight average molecular weight (Mw) in terms of standard polystyrene.

Solid Content Concentration

Two g of a sample was accurately weighed (weight: X2) in an aluminum dish (weight: X1), and dried at 105° C. in a hot air drier for 2 hours. Next, the dried product was cooled in a desiccator and weighed together with the aluminum dish (weight: X3), and the solid content concentration was calculated according to the following calculation expression.

$$\text{Solid content concentration (\% by weight)} = (X3-X1) \times 100/X2$$

Content Rate of Each Resin Acid in Disproportionated Rosin Acid Resin

After a disproportionated rosin acid resin was converted into a derivative in the form of methyl ester according to a diazomethane method, the derivative was subjected to measurement of each content rate (unit: % by weight) of abietic acid, neoabietic acid, palustric acid, dehydroabietic acid, and other component(s) in the disproportionated rosin acid resin by gas chromatography analysis in the following conditions according to an analysis method of "Rosin acids, %" described in ASTM D803.

Analysis apparatus: gas chromatograph (Model "GC-15A", manufactured by Shimadzu Corporation)

Column: capillary column URBON HR-SS-10, FS-bonded, 0.25 mm×50 m

Liquid phase: cyanopropylsilicon

Detector: FID

Measurement conditions: oven temperature 195° C., injection temperature 250° C., detection temperature 250° C.

Carrier gas: He

Content Rate of Rosin-Based Surfactant in Synthetic Polyisoprene Latex

Two ml of water was added to 0.1 g of the synthetic polyisoprene latex, and the resultant was diluted with acetonitrile to 10 ml. The resulting liquid was well shaken, and the rubber content was coagulated. Thereafter, the aqueous layer was filtered by a 0.2 μm disc filter. The liquid was analyzed by high performance liquid chromatography, and the content rate (unit: parts by weight) of the rosin-based surfactant based on 100 parts of the synthetic polyisoprene was calculated.

Tensile Strength of Dip Molded Article

A dip molded article was subjected to punching by a dumbbell (trade name "Super Dumbbell (Model: SDMK-100C)", manufactured by Dumbbell Co., Ltd.) to produce a test piece for tensile strength measurement, based on ASTM D412. The test piece was pulled at a tensile rate of 500 mm/min by a Tensilon universal tester (trade name "RTG-1210" manufactured by ORIENTEC Co., Ltd.) to measure the tensile strength (unit: MPa) immediately before breakage.

Tear Strength of Dip Molded Article

A dip molded article was left to stand in a constant temperature and constant humidity chamber at 23° C. and a relative humidity of 50% for 24 hours or more and then subjected to punching by a dumbbell (trade name "Die C", manufactured by Dumbbell Co., Ltd.) to produce a test piece for tear strength measurement, based on ASTM D624-00. The test piece was pulled at a tensile rate of 500 ram/min by a Tensilon universal tester (trade name "RTG-1210" manufactured by A&D Company Limited) to measure the tear strength (unit: N/mm).

Production Example 1

(Production of Disproportionated Rosin Acid Resin (A-1))

A four-necked flask having a volume of 500 ml, equipped with a cooling tube, a nitrogen introduction tube, a stopper cock and a stirring apparatus, was charged with 350 parts of a tall rosin molten at 170° C. (the content rate of abietic acid was 43% by weight, the content rate of neoabietic acid was 22% by weight, the content rate of palustric acid was 16% by weight, the content rate of dehydroabietic acid was 10% by weight and the content rate of other component(s) was 9% by weight, and the acid value was 169.0 mgKOH/g), and purged with a nitrogen gas, thereafter 0.25 parts of palladium-carbon (palladium 5% by weight) was added as a disproportionation catalyst, and the resultant was heated to a temperature of 270° C. and subjected to a disproportionation reaction in conditions of a reaction temperature of 270° C. and a reaction time of 4 hours. Next, the reaction liquid obtained by the disproportionation reaction was cooled to 200° C., and the disproportionation catalyst was removed by a filtering unit, thereby obtaining disproportionated rosin acid resin (A-1). Disproportionated rosin acid resin (A-1) obtained was subjected to measurement of the content rate of each resin acid in the disproportionated rosin acid resin according to the method, and thus abietic acid, neoabietic acid and palustric acid were not detected, the content rate of dehydroabietic acid was 90% by weight and the content rate of other component(s) was 10% by weight. The results are shown in Table 1.

Production Example 2

(Production of Disproportionated Rosin Acid Resin (A-2))

Disproportionated rosin acid resin (A-2) was obtained in the same manner as in Production Example 1 except that the reaction time of the disproportionation reaction was changed from 4 hours to 3 hours. Disproportionated rosin acid resin (A-2) obtained was subjected to measurement of the content rate of each resin acid in the disproportionated rosin acid resin according to the method, and thus neoabietic acid and palustric acid were not detected, the content rate of abietic acid was 1% by weight, the content rate of dehydroabietic acid was 89% by weight and the content rate of other component(s) was 10% by weight. The results are shown in Table 1.

Production Example 3

(Production of Disproportionated Rosin Acid Resin (A-3))

Disproportionated rosin acid resin (A-3) was obtained in the same manner as in Production Example 1 except that the reaction time of the disproportionation reaction was changed from 4 hours to 2 hours. Disproportionated rosin acid resin (A-3) obtained was subjected to measurement of the content rate of each resin acid in the disproportionated rosin acid resin according to the method, and thus the content rate of abietic acid was 2% by weight, the content rate of neoabietic acid was 1% by weight, the content rate of palustric acid was 1% by weight, the content rate of dehydroabietic acid was 85% by weight and the content rate of other component(s) was 11% by weight. The results are shown in Table 1.

Production Example 4

(Production of Disproportionated Rosin Acid Resin (A'-4))

Disproportionated rosin acid resin (A'-4) was obtained in the same manner as in Production Example 1 except that the reaction time of the disproportionation reaction was changed from 4 hours to 30 minutes. Disproportionated rosin acid resin (A'-4) obtained was subjected to measurement of the content rate of each resin acid in the disproportionated rosin acid resin according to the method, and thus the content rate of abietic acid was 10% by weight, the content rate of neoabietic acid was 5% by weight, the content rate of palustric acid was 5% by weight, the content rate of dehydroabietic acid was 67% by weight and the content rate of other component(s) was 13% by weight. The results are shown in Table 1.

Production Example 5

(Production of Disproportionated Rosin Acid Resin (A'-5))

Disproportionated rosin acid resin (A'-5) was obtained in the same manner as in Production Example 1 except that the reaction temperature of the disproportionation reaction was changed from 270° C. to 200° C. and the reaction time of the disproportionation reaction was changed from 4 hours to 1 minute. Disproportionated rosin acid resin (A'-5) obtained was subjected to measurement of the content rate of each resin acid in the disproportionated rosin acid resin according to the method, and thus the content rate of abietic acid was 40% by weight, the content rate of neoabietic acid was 20% by weight, the content rate of palustric acid was 15% by weight, the content rate of dehydroabietic acid was 13% by weight and the content rate of other component(s) was 12% by weight. The results are shown in Table 1.

Example 1

(Production of Synthetic Polyisoprene Latex)

Synthetic polyisoprene (trade name "NIPOL IR2200L" produced by Zeon Corporation, homopolymer of isoprene, amount of cis bond unit: 98%) having a weight average molecular weight of 1,300,000 was mixed with cyclohexane, and heated to a temperature of 60° C. with stirring and thus molten, thereby obtaining cyclohexane solution (a) of synthetic polyisoprene, having a viscosity of 12,000 mPa·s, measured by a B-type viscometer, and a solid content concentration of 8% by weight.

On the other hand, disproportionated rosin acid resin (A-1) obtained in Production Example 1 was neutralized with an aqueous potassium hydroxide solution to provide a rosin-based surfactant, thereby obtaining aqueous potassium rosinate solution (b) having a concentration of 30% by weight and a pH of 10.5.

Next, cyclohexane solution (a) and aqueous potassium rosinate solution (b) were mixed by use of trade name "Multiline Mixer MS26-MMR-5.5L" (manufactured by Satake Chemical Equipment Mfg., Ltd.) so that the weight ratio was 1:1.5 (so that the amount of a potassium salt of rosin was 2 parts based on 100 parts of the synthetic polyisoprene), and the resultant was subsequently mixed and emulsified at a rotational speed of 4100 rpm by use of trade name "Milder MDN310" (manufactured by Pacific Machinery & Engineering Co., Ltd.), thereby obtaining emulsified liquid (c). Here, the total flow rate of cyclohexane solution (a) and aqueous potassium rosinate solution (b) to be fed was 2,000 kg/hr, the temperature was 60° C., and the back pressure (gauge pressure) was 0.5 MPa.

Next, emulsified liquid (c) was warmed to 80° C. under a reduced pressure of −0.01 to −0.09 MPa (gauge pressure) to distill off cyclohexane, thereby obtaining water dispersion liquid (d) of synthetic polyisoprene. Here, a defoamer (trade name "SM5515", Dow Corning Toray Co., Ltd.) was continuously added with spraying so as to be in an amount of 300 ppm by weight relative to synthetic polyisoprene in emulsified liquid (c), thereby obtaining water dispersion liquid (d). In distillation off of cyclohexane, emulsified liquid (c) was adjusted so as to be in an amount of 70% by volume or less based on the volume of a tank, and slowly stirred at a rotational speed of 60 rpm by use of a three-stage pitched paddle impeller as a stirring impeller.

Water dispersion liquid (d) obtained was centrifuged at 4,000 to 5,000 G by use of a continuous centrifuge machine (trade name "SRG510", manufactured by Alfa Laval), thereby obtaining synthetic polyisoprene latex (e) having a solid content concentration of 56% by weight, as a light liquid. The conditions in centrifugation were as follows: the solid content concentration of water dispersion liquid (d) before centrifugation was 10% by weight, the flow rate in continuous centrifugation was 1300 kg/hr, and the back pressure (gauge pressure) of the centrifuge machine was 1.5 MPa. Synthetic polyisoprene latex (e) obtained had a solid content concentration of 56% by weight, a volume average particle size of 1.0 μm, a pH of 10, a viscosity of 120 mPa·s, measured by a B-type viscometer, and a content rate of disproportionated rosin acid resin (A-1) derived from aqueous potassium rosinate solution (b), of 3.0 parts per 100 parts of the synthetic polyisoprene. In addition, no aggregate was observed in synthetic polyisoprene latex (e), and the amount of metals remaining in synthetic polyisoprene latex (e) (total content of an aluminum atom and a titanium atom) was 250 ppm by weight.

(Preparation of Latex Composition)

Next, 1.0 part of sodium dodecylbenzenesulfonate was added based on 100 parts of the synthetic polyisoprene in synthetic polyisoprene latex (e), and thereafter diluted with distilled water to a solid content concentration of 40% by weight. Furthermore, 1.5 parts of colloidal sulfur, 1.5 parts of zinc oxide, 0.3 parts of zinc diethyldithiocarbamate, 0.5 parts of zinc dibutyldithiocarbamate, and 0.7 parts of zinc 2-mercaptobenzothiazole, each in the form of a dispersion having 50% of an active component in distilled water, in terms of the solid content based on 100 parts of the synthetic polyisoprene in synthetic polyisoprene latex (e), were added as water dispersions of respective compounding agents. Thereafter, a water dispersion of an antioxidant (trade name "Wingstay L" manufactured by Goodyear Tire and Rubber Company), having 2 parts of an active component based on 100 parts of the synthetic polyisoprene in synthetic polyisoprene latex (e), was added to obtain latex composition (f). Thereafter, latex composition (f) obtained was aged in a constant temperature water bath at a set temperature of 30±0.5° C. for 48 hours, under stirring with a stirrer.

(Production of Dip Molded Article)

After latex composition (f) was dip molded in a ceramic mold coated with calcium nitrate in advance, washed with distilled water at 60±1.0° C. for 5 minutes, heated in an oven at 120° C. for 25 minutes and thus vulcanized, thereby obtaining a ceramic mold covered with a film. Thereafter, the resulting film was coated with talc, and the film was released from the ceramic mold with fusion of the film being prevented, thereby obtaining a dip molded article. The resulting dip molded article was used to perform each measurement of tensile strength and tear strength according to the methods. The results are shown in Table 1.

Example 2

Preparation of a latex composition and production of a dip molded article were performed and evaluation was made in the same manner as in Example 1 except that disproportionated rosin acid resin (A-2) obtained in Production Example 2 was used instead of disproportionated rosin acid resin (A-1). The results are shown in Table 1.

Example 3

Preparation of a latex composition and production of a dip molded article were performed and evaluation was made in the same manner as in Example 1 except that disproportionated rosin acid resin (A-3) obtained in Production Example 3 was used instead of disproportionated rosin acid resin (A-1). The results are shown in Table 1.

Comparative Example 1

Preparation of a latex composition and production of a dip molded article were performed and evaluation was made in the same manner as in Example 1 except that disproportionated rosin acid resin (A'-4) obtained in Production Example 4 was used instead of disproportionated rosin acid resin (A-1). The results are shown in Table 1.

Comparative Example 2

Preparation of a latex composition and production of a dip molded article were performed and evaluation was made in the same manner as in Example 1 except that disproportionated rosin acid resin (A'-5) obtained in Production Example 5 was used instead of disproportionated rosin acid resin (A-1). The results are shown in Table 1.

TABLE 1

|  | Composition of rosin-based surfactant used | | | | | Latex composition | | Dip molded article | |
| --- | --- | --- | --- | --- | --- | --- | --- | --- | --- |
|  | Abietic acid (% by weight) | Neoabietic acid (% by weight) | Palustric acid (% by weight) | Dehydroabietic acid (% by weight) | Other(s) (% by weight) | Synthetic polyisoprene (Parts) | Potassium salt of rosin (Parts) | Tensile strength (MPa) | Tear strength (N/mm) |
| Example 1 | 0 | 0 | 0 | 90 | 10 | 100 | 2 | 24.3 | 30.3 |
| Example 2 | 1 | 0 | 0 | 89 | 10 | 100 | 2 | 25.1 | 29.8 |
| Example 3 | 2 | 1 | 1 | 85 | 11 | 100 | 2 | 23.2 | 27.6 |
| Comparative Example 1 | 10 | 5 | 5 | 67 | 13 | 100 | 2 | 16.5 | 18.2 |
| Comparative Example 2 | 40 | 20 | 15 | 13 | 12 | 100 | 2 | 12.2 | 8.6 |

As clear from Table 1, when the polymer latex was produced by emulsifying the polymer solution of synthetic polyisoprene in water in the presence of the rosin-based surfactant where the total content rate of abietic acid, neoabietic acid and palustric acid, and salts thereof was 5% by weight or less, thereby obtaining an emulsified liquid, the dip molded article obtained by use of the polymer latex was excellent in tensile strength and tear strength (Examples 1 to 3).

On the other hand, when the rosin-based surfactant used was one where the total content rate of abietic acid, neoabietic acid and palustric acid, and salts thereof was more than 5% by weight, the resulting dip molded article was inferior in tensile strength and tear strength (Comparative Examples 1 and 2).

The invention claimed is:

1. A method for producing a polymer latex, comprising:
a step of emulsifying a polymer solution of a synthetic polyisoprene and/or a styrene-isoprene-styrene block copolymer, in water in the presence of a rosin and/or a rosin metal salt, thereby obtaining an emulsified liquid, wherein
the rosin and/or the rosin metal salt to be used have/has a total content rate of abietic acid, neoabietic acid and palustric acid, and salts thereof, of 5% by weight or less, and
a total content rate of the rosin and/or the rosin metal salt in the polymer latex is more than 1.5 parts by weight based on 100 parts by weight in total of the synthetic polyisoprene and/or the styrene-isoprene-styrene block copolymer included in the polymer latex.

2. The method for producing a polymer latex according to claim 1, wherein the synthetic polyisoprene and/or the styrene-isoprene-styrene block copolymer, to be used, are/is obtained according to polymerization by anionic polymerization.

3. The method for producing a polymer latex according to claim 2, wherein the polymer solution of the synthetic polyisoprene and/or the styrene-isoprene-styrene block copolymer is obtained according to polymerization by anionic polymerization, and the polymer solution is directly emulsified by use of an aqueous solution of the rosin and/or the rosin metal salt without any coagulation, to thereby obtain the emulsified liquid.

4. The method for producing a polymer latex according to claim 1, wherein the rosin and/or the rosin metal salt to be used have/has a content rate of dehydroabietic acid, of 70 to 100% by weight.

5. A method for producing a latex composition, comprising a step of adding a vulcanizing agent to a polymer latex obtained by the method according to claim 1.

6. A method for producing a dip molded article, comprising:
a step of dip molding a latex composition obtained by the method according to claim 5.

7. A method for producing a packaging structure, comprising:
coating a first sheet substrate and/or a second sheet substrate with a polymer latex obtained by the method according to claim 1, to form a coating film, and performing adhesion and stacking of at least a part of the first sheet substrate and at least a part of the second sheet substrate by the coating film,
wherein an object to be packaged is received between the first sheet substrate and the second sheet substrate.

8. A method for producing a polymer latex, comprising:
a step of emulsifying a polymer solution of a synthetic polyisoprene and/or a styrene-isoprene-styrene block copolymer, in water in the presence of a rosin and/or a rosin metal salt, thereby obtaining an emulsified liquid, wherein
the rosin and/or the rosin metal salt to be used have/has a total content rate of abietic acid, neoabietic acid and palustric acid, and salts thereof, of 5% by weight or less, and
the rosin and/or the rosin metal salt to be used have/has a content rate of dehydroabietic acid, of 70 to 100% by weight.

9. The method for producing a polymer latex according to claim 8, wherein the synthetic polyisoprene and/or the styrene-isoprene-styrene block copolymer, to be used, are/is obtained according to polymerization by anionic polymerization.

10. The method for producing a polymer latex according to claim 9, wherein the polymer solution of the synthetic polyisoprene and/or the styrene-isoprene-styrene block copolymer is obtained according to polymerization by anionic polymerization, and the polymer solution is directly emulsified by use of an aqueous solution of the rosin and/or the rosin metal salt without any coagulation, to thereby obtain the emulsified liquid.

11. A method for producing a latex composition, comprising a step of adding a vulcanizing agent to a polymer latex obtained by the method according to claim 8.

12. A method for producing a dip molded article, comprising:
- a step of dip molding a latex composition obtained by the method according to claim 11.

13. A method for producing a packaging structure, comprising:
- coating a first sheet substrate and/or a second sheet substrate with a polymer latex obtained by the method according to claim 8, to form a coating film, and performing adhesion and stacking of at least a part of the first sheet substrate and at least a part of the second sheet substrate by the coating film,
- wherein an object to be packaged is received between the first sheet substrate and the second sheet substrate.

* * * * *